US009457636B2

(12) United States Patent
Minoda et al.

(10) Patent No.: US 9,457,636 B2
(45) Date of Patent: Oct. 4, 2016

(54) SUSPENSION FRAME STRUCTURE

(71) Applicant: SUZUKI MOTOR CORPORATION, Hamamatsu (JP)

(72) Inventors: Yousei Minoda, Hamamatsu (JP); Takehiro Shoji, Hamamatsu (JP); Takako Ozawa, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 14/839,739

(22) Filed: Aug. 28, 2015

(65) Prior Publication Data
US 2016/0068036 A1   Mar. 10, 2016

(30) Foreign Application Priority Data
Sep. 5, 2014 (JP) ................................. 2014-181786

(51) Int. Cl.
*B60G 21/055* (2006.01)
*B60G 7/00* (2006.01)
*B60G 7/02* (2006.01)

(52) U.S. Cl.
CPC ............ *B60G 21/055* (2013.01); *B60G 7/001* (2013.01); *B60G 7/02* (2013.01); *B60G 2204/1431* (2013.01); *B60G 2204/15* (2013.01); *B60G 2206/122* (2013.01); *B60G 2206/606* (2013.01)

(58) Field of Classification Search
CPC .................... B60G 2206/012; B60G 2206/60; B60G 2206/606; B60G 2206/122; B60G 2204/15; B60G 2204/1431; B60G 21/055; B60G 21/0551; B60G 7/001; B60G 7/02; B62D 21/11
See application file for complete search history.

(56) References Cited

U.S. PATENT DOCUMENTS

| 6,378,268 | B1* | 4/2002 | Guyomard | B29C 45/14311 280/800 |
| 6,409,216 | B2* | 6/2002 | Suzuki | B62D 21/11 280/124.109 |
| 6,494,472 | B2* | 12/2002 | Suzuki | B62D 21/11 280/124.109 |
| 7,938,414 | B2* | 5/2011 | Buschjohann | B60G 3/202 280/124.109 |
| 2001/0022437 | A1* | 9/2001 | Suzuki | B60G 7/02 280/124.134 |
| 2015/0166104 | A1* | 6/2015 | Ohhama | B62D 21/11 296/193.01 |

FOREIGN PATENT DOCUMENTS

| JP | 2000118435 A | * | 4/2000 |
| JP | 2000344130 A | * | 12/2000 |
| JP | 2001294172 A | * | 10/2001 |
| JP | 2005138652 A | * | 6/2005 |
| JP | 2008001307 | | 1/2008 |

* cited by examiner

Primary Examiner — Drew Brown
(74) Attorney, Agent, or Firm — Silicon Valley Patent Group LLP

(57) ABSTRACT

A suspension frame structure comprises a suspension frame and a reinforcement. The reinforcement has a support portion that extends in the up-down direction within the suspension frame and connects an upper wall and a lower wall of the suspension frame to each other, a front upright wall that extends outward in the vehicle-width direction and further to the front side of a vehicle from a side face of the support portion and is joined to at least one of the upper wall and the lower wall of the suspension frame, and a rear upright wall that extends outward in the vehicle-width direction and further to the rear side of the vehicle from the side face of the support portion and is joined to at least one of the upper wall and the lower wall of the suspension frame. The front upright wall and the rear upright wall form an L-shape.

16 Claims, 3 Drawing Sheets

SUSPENSION FRAME STRUCTURE

CROSS-REFERENCE TO RELATED APPLICATION

This application is based upon and claims the benefit of priority from the prior Japanese Patent Application No. 2014-181786, filed on Sep. 5, 2014, the entire contents of which are incorporated herein by reference.

FIELD

The present invention relates to a suspension frame structure comprising a suspension frame that extends in a vehicle-width direction in a lower part of a vehicle and fixes suspension arms located on the outside in the vehicle-width direction, and a reinforcement arranged within the suspension frame.

BACKGROUND

Ordinarily, a suspension frame is attached to a vehicle so as to be spanned between a pair of left and right side members extending in the front-rear direction. Suspension arms (which are referred to also as lower arms) that suspend wheels are attached to the outside, with respect to the vehicle-width direction, of the suspension frame (e.g., JP 2008-001307). Since loads generated due to vibrations during driving are applied to the suspension arms, an improvement in rigidity is achieved in JP 2008-001307 by arranging a reinforcement within the suspension frame.

The reinforcement provided in the suspension in JP 2008-001307 is considered to be effective, to some extent, in increasing the rigidity of the suspension frame itself. However, in JP 2008-001307, since the reinforcement is arranged along a rear wall, the reinforcement can contribute to suppressing of deformation of this rear wall but cannot achieve a sufficient effect of suppressing deformation of a front wall. For this reason, there has been room for further improvement in the configuration of JP 2008-001307.

In view of the foregoing problem, an object of the present invention is to provide a suspension frame capable of obtaining a higher rigidity with respect to loads that are input from suspension arms, and also capable of favorably suppressing deformation.

SUMMARY OF THE DISCLOSURE

To solve the foregoing problem, a feature of a representative configuration of a suspension frame structure according to the present invention lies in a suspension frame structure comprising: a suspension frame that extends in a vehicle-width direction in a lower part of a vehicle and fixes a suspension arm located on the outside in the vehicle-width direction; and a reinforcement arranged within the suspension frame. The reinforcement includes: a support portion that extends in an up-down direction within the suspension frame and connects an upper wall and a lower wall of the suspension frame to each other; a front upright wall that extends outward in the vehicle-width direction and further to a vehicle front side from a side face of the support portion, the front upright wall being joined to at least one of the upper wall and the lower wall of the suspension frame; and a rear upright wall that extends outward in the vehicle-width direction and further to a vehicle rear side from the side face of the support portion, the rear upright wall being joined to at least one of the upper wall and the lower wall of the suspension frame. In a plan view, the front upright wall and the rear upright wall form an L-shape that bends at the support portion.

With the above configuration, the reinforcement has an L-shape formed by the front upright wall, the rear upright wall, and the support portion. For this reason, the reinforcement has a three-dimensional shape in the front-rear direction and the left-right direction. Accordingly, a high rigidity can be obtained with respect to loads applied from the suspension arm, and accordingly, the effect of suppressing deformation of the suspension frame can be enhanced.

In particular, the L-shape formed by the front upright wall and the rear upright wall being open in the front-rear direction makes it possible to favorably suppress deformation of a front wall and a rear wall of the suspension frame with respect to loads applied in the left-right direction. In addition, as a result of the front upright wall and the rear upright wall being joined to the upper wall and the lower wall of the suspension frame, it is also possible to enhance the effect of suppressing deformation of the upper wall and the lower wall of the suspension frame with respect to loads applied in the up-down direction.

The suspension frame may include: a center portion extending in the vehicle-width direction; a front arm portion that extends outward from a front portion of an end of the center portion and fixes the suspension arm; and a rear arm portion that extends outward from a rear portion of the end of the center portion and fixes the suspension arm. In a plan view, the support portion may be arranged inward, in the vehicle-width direction, of an intersection point of extension lines of a front wall of the center portion and a front wall of the front arm portion, or an intersection point of extension lines of a rear wall of the center portion and a rear wall of the rear arm portion. Ends of the front upright wall and the rear upright wall on the outside in the vehicle-width direction may be located outward, in the vehicle-width direction, of the intersection point of the extension lines of the front wall of the center portion and the front wall of the front arm portion or the intersection point of the extension lines of the rear wall of the center portion and the rear wall of the rear arm portion.

With this configuration, the reinforcement is arranged near the boundary between the center portion and the front and rear arm portions within the suspension frame. Since the angles of the front wall and the rear wall change near the boundary between the center portion and the front and rear arm portions, deformation is more likely to occur than in other portions due to loads applied from the suspension arm. Arranging the reinforcement near the boundary makes it possible to favorably reinforce the portion that is likely to undergo deformation and further enhance the deformation suppressing effect.

In a plan view, an angle of bend formed by the front upright wall and the rear upright wall may be 90 degrees or greater, and an angle formed by a line passing through the support portion in the vehicle-width direction and the front upright wall may be substantially equal to an angle formed by that line and the rear upright wall. The effect of the front upright wall and the rear upright wall reinforcing the support portion can be enhanced by setting the angle of bend, i.e., an opening angle formed by the front upright wall and the rear upright wall to 90 degrees or greater. In addition, the support portion can be reinforced in a balanced manner by equalizing the angle formed by the support portion and the front upright wall and the angle formed by the support portion and the rear upright wall.

The front upright wall may extend along the front wall of the front arm portion, and the rear upright wall may extend along the rear wall of the rear arm portion. As a result of the front upright wall and the rear upright wall thus extending respectively along, i.e., being close to the front wall of the front arm portion and the rear wall of the rear arm portion, the front upright wall and the rear upright wall can be linked respectively to the front wall of the front arm portion and the rear wall of the rear arm portion. Accordingly, stress can be efficiently distributed, and the deformation amount of the suspension frame can be reduced. In addition, with this configuration, the front upright wall and the rear upright wall are arranged so as to cover the cross-section of the center portion. Thereby, an effect of suppressing torsional deformation of the center portion can also be obtained.

The suspension frame structure may further comprise an extension bracket that is smoothly attached to a rear edge of the rear arm portion so as to extend the rear arm portion, and connects the suspension frame to a vehicle structure member. In a plan view, an edge line of the extension bracket on the inside of the vehicle may be continuous with an extension line of the rear upright wall. Thereby, loads received by the rear upright wall can be efficiently transmitted to the vehicle structure member via the extension bracket, and it is accordingly possible to further enhance the aforementioned deformation suppressing effect.

The support portion may support a steering gear box that is arranged above the suspension frame and extends in the vehicle-width direction. Since the steering gear box has a high rigidity, connecting this steering gear box to the suspension frame via the support portion of the reinforcement makes it possible to increase the rigidity of the suspension frame. In addition, as a result of the front upright wall and the rear upright wall being joined to the support portion, the rigidity of the support portion increases. It is thereby possible to increase the attaching strength of the steering gear box, and achieve an improvement of control stability and a reduction of vibrations generated due to road noise or the like.

According to the present invention, a higher rigidity can be obtained with respect to loads that are input from suspension arms, and a suspension frame capable of favorably suppressing deformation can also be provided.

DETAILED DESCRIPTION

Figure 1:
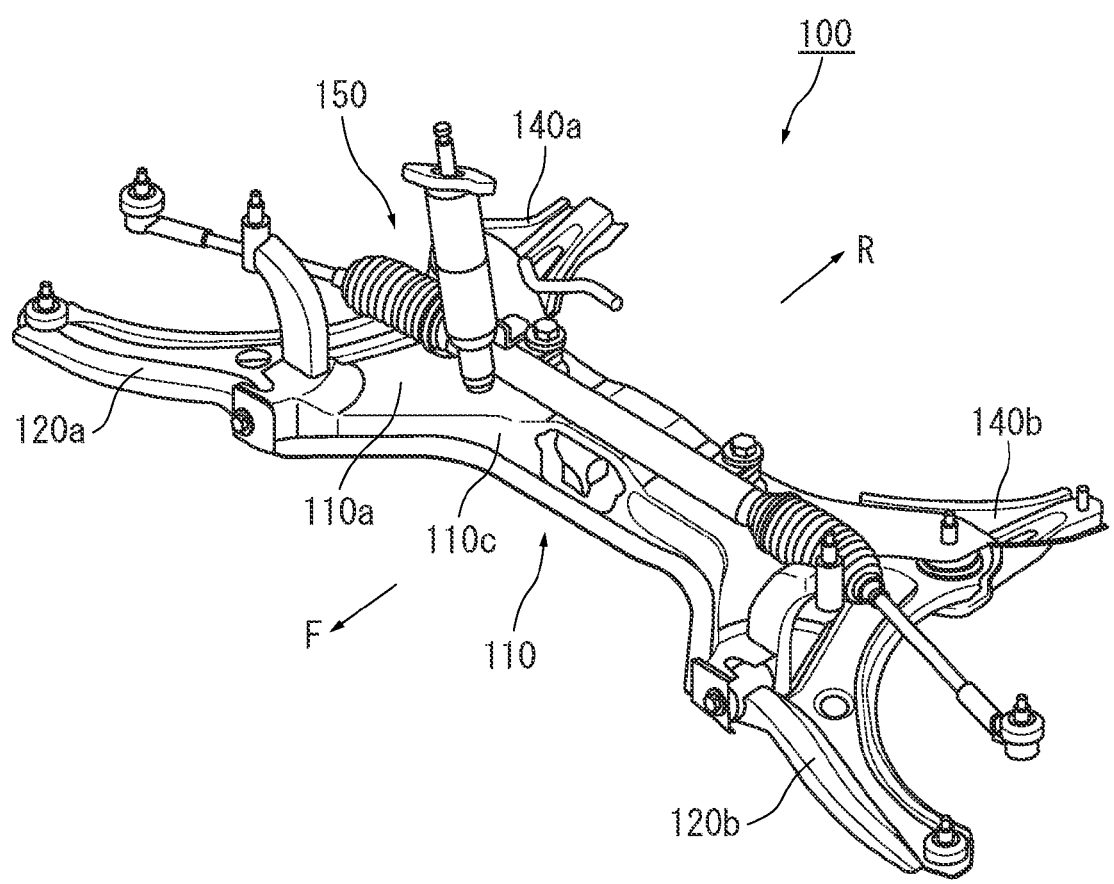
FIG. 1 is a perspective view of an overall suspension frame structure in the present embodiment.

A preferable embodiment of the present invention will be hereinafter described in detail with reference to the attached drawings. The dimensions, materials, other specific values, and the like described in the embodiment are mere examples for facilitating understanding of the invention, and do not limit the present invention unless otherwise stated. Note that in the present specification and drawings, elements having substantially the same functions and configurations will be assigned the same reference numerals to omit redundant descriptions, and elements that are not directly related to the present invention will be omitted in the drawings.

Figure 2:
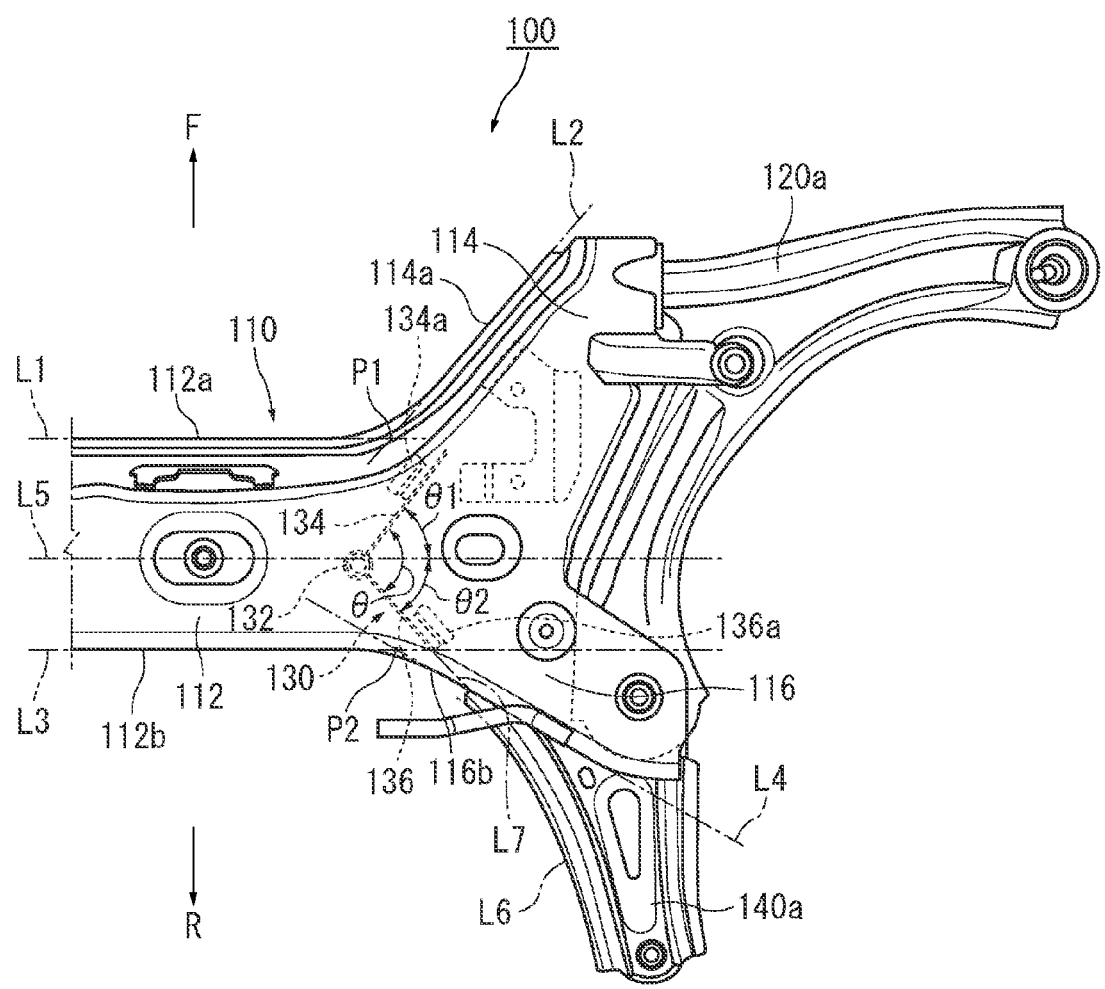
FIG. 2 is an enlarged view of a right portion of the suspension frame structure in FIG. 1 as observed from above.
Figure 3:
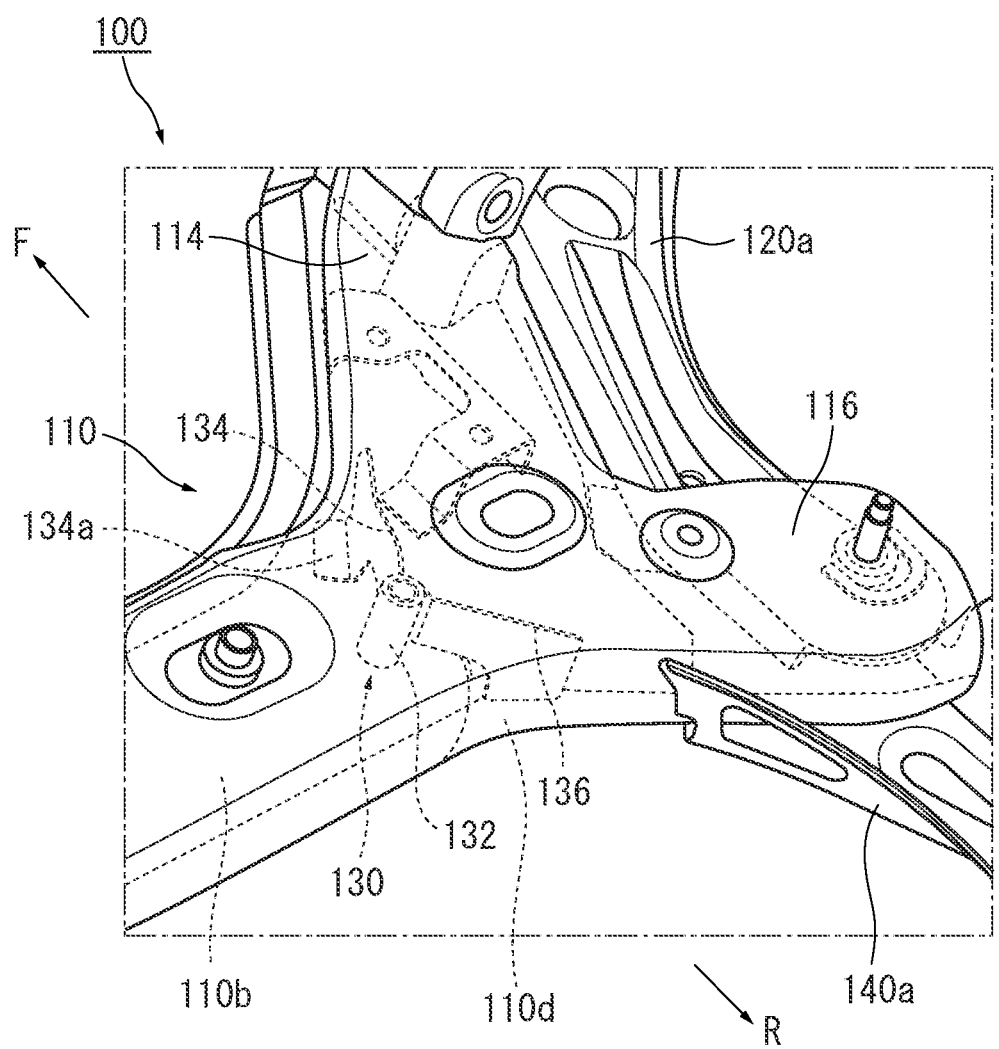
FIG. 3 is a perspective view of the suspension frame structure in FIG. 2 as observed from above on the inside of a vehicle.

FIG. 1 is a perspective view of an overall suspension frame structure 100 according to the present embodiment. FIG. 2 is an enlarged view of a right portion of the suspension frame structure 100 in FIG. 1 as observed from above. FIG. 3 is a perspective view of the suspension frame structure 100 in FIG. 2 as observed from above on the inside of a vehicle. Note that, in order to facilitate understanding, FIGS. 2 and 3 do not show a steering gear box 150 shown in FIG. 1, and indicate a reinforcement 130 within a suspension frame 110 using phantom lines.

As shown in FIG. 1, the suspension frame structure 100 according to the present embodiment includes a suspension frame 110 extending in a vehicle-width direction in a lower part of the vehicle, a reinforcement 130 (see FIGS. 2 and 3) arranged within this suspension frame 110, and a right extension bracket 140a and a left extension bracket 140b that connect the suspension frame 110 to a vehicle structure member (not shown).

A right suspension arm 120a and a left suspension arm 120b, which are located on the outside of the suspension frame 110 in the vehicle-width direction, are fixed respectively to the right and left sides of the suspension frame 110. Furthermore, in the present embodiment, a steering gear box 150 extending in the vehicle-width direction is arranged above the suspension frame 110. Although the structure of the right side of the suspension frame structure 100 will be described below as an example, it should be noted that, needless to say, a similar configuration is also provided on the left side.

As shown in FIG. 2, a center portion 112 extends in the vehicle-width direction at the center of the suspension frame 110. A front arm portion 114 extends outward from a front portion of an end of this center portion 112, and a rear arm portion 116 extends outward from a rear portion of the end of the center portion 112. In the suspension frame 110, a suspension arm (right suspension arm 120a) is fixed to the front arm portion 114 and rear arm portion 116.

As shown in FIG. 3, the reinforcement 130 is arranged within the suspension frame 110. The reinforcement 130 includes a support portion 132, a front upright wall 134, and a rear upright wall 136. The support portion 132 extends in the up-down direction within the suspension frame 110, and connects an upper wall 110a (see FIG. 1) and a lower wall 110b (see FIG. 3) of the suspension frame 110 to each other. The front upright wall 134 extends from a side face of the support portion 132 outward in the vehicle-width direction and further to the vehicle front side, and is joined to the upper wall 110a or the lower wall 110b of the suspension frame 110. The rear upright wall 136 extends from the side face of the support portion 132 outward in the vehicle-width direction and further to the vehicle rear side, and is joined to the upper wall 110a or the lower wall 110b of the suspension frame 110.

Note that, in the present embodiment, upper ends of the front upright wall 134 and the rear upright wall 136 are joined to the upper wall 110a of the suspension frame 110, and thereafter a flange 134a of the front upright wall 134 and a flange 136a of the rear upright wall 136 (see FIG. 2) are joined to the lower wall 110b of the suspension frame 110. However, the configuration is not limited thereto, and the front upright wall 134 and the rear upright wall 136 need only be joined to at least one of the upper wall 110a and the lower wall 110b of the suspension frame 110.

As a feature of the present embodiment, as shown in FIG. 2, in the reinforcement 130, the front upright wall 134 and the rear upright wall 136 form an L-shape that bends at the support portion 132 in a plan view. The shape of the reinforcement 130 is thereby three-dimensional in the front-rear direction and the left-right direction, and accordingly a high rigidity can be obtained with respect to loads applied from the right suspension arm 120*a* (suspension arm). Accordingly, the effect of suppressing deformation of the suspension frame 110 can be enhanced.

In particular, in the present embodiment, the reinforcement 130 has an L-shape formed by the front upright wall 134 and the rear upright wall 136, the L-shape being open in the front-rear direction. This configuration makes it possible to favorably suppress deformation of the front wall 110*c* (see FIG. 1) and the rear wall 110*d* (see FIG. 3) of the suspension frame 110 caused by loads applied in the left-right direction. In addition, as a result of the front upright wall 134 and the rear upright wall 136 being joined to the upper wall 110*a* and the lower wall 110*b* of the suspension frame 110, it is possible to enhance the effect of suppressing deformation of the upper wall 110*a* and the lower wall 110*b* of the suspension frame 110 with respect to loads applied in the up-down direction.

Furthermore, in the present embodiment, as shown in FIG. 2, in the reinforcement 130, the support portion 132 is arranged inward, in the vehicle-width direction, of an intersection point P1 (inflection point) of an extension line L1 of the front wall 112*a* of the center portion 112 and an extension line L2 of the front wall 114*a* of the front arm portion 114. Also, ends of the front upright wall 134 and the rear upright wall 136 on the outside in the vehicle-width direction are located outward, in the vehicle-width direction, of the intersection point P1 of the extension lines L1 and L2. That is to say, in the present embodiment, the reinforcement 130 is arranged near the boundary between the center portion 112 and the front arm portion 114 within the suspension frame 110.

As shown in FIG. 2, the angle of a portion at which the front walls 112*a* and 114*a* of the center portion 112 and the front arm portion 114 are continuous with each other changes near the boundary between the center portion 112 and the front arm portion 114, and accordingly, deformation tends to occur due to concentration of loads. By arranging the reinforcement 130 near the boundary between the center portion 112 and the front arm portion 114 as described above, the vicinity of the boundary can be favorably reinforced, and deformation thereof can be favorably suppressed.

The present embodiment has described an exemplary configuration in which the support portion 132 is arranged inward, in the vehicle-width direction, of the intersection point P1 of the extension lines L1 and L2 of the front wall 112*a* of the center portion 112 and the front wall 114*a* of the front arm portion 114, and the ends of the front upright wall 134 and the rear upright wall 136 on the outside in the vehicle-width direction are located outward, in the vehicle-width direction, of the intersection point P1. However, it should be noted that the present invention is not limited thereto. For example, a configuration may also be employed in which the support portion 132 is arranged inward, in the vehicle-width direction, of an intersection point P2 of an extension line L3 of the rear wall 112*b* of the center portion 112 and an extension line L4 of the rear wall 116*b* of the rear arm portion 116, and the ends of the front upright wall 134 and the rear upright wall 136 on the outside in the vehicle-width direction are located outward, in the vehicle-width direction, of the intersection point P2 of the extension lines L3 and L4. With this configuration, the vicinity of the boundary between the rear wall 112*b* of the center portion 112 and the rear wall 116*b* of the rear arm portion 116 can be favorably reinforced.

In the present embodiment, as shown in FIG. 2, in a plan view, an angle of bend θ formed by the front upright wall 134 and the rear upright wall 136 is 90 degrees or greater, and an angle θ1 formed by a line L5 passing through the support portion 132 in the vehicle-width direction and the front upright wall 134 is roughly equal to an angle θ2 formed by the line L5 and the rear upright wall 136. By thus setting the angle of bend θ, i.e., the opening angle of the front upright wall 134 and the rear upright wall 136 to 90 degrees or greater, the effect of the front upright wall 134 and the rear upright wall 136 reinforcing the support portion 132 can be enhanced. In addition, by equalizing the angles θ1 and θ2 formed by the support portion 132 and the front and rear upright walls 134 and 136, the support portion 132 can be reinforced in a balanced manner, making it possible to enhance the aforementioned effect.

Furthermore, in the present embodiment, as shown in FIG. 2, the front upright wall 134 extends along the front wall 114*a* of the front arm portion 114, and the rear upright wall 136 extends along the rear wall 116*b* of the rear arm portion 116. That is to say, the front upright wall 134 extends while approaching the front wall 114*a* of the front arm portion 114, and the rear upright wall 136 extends while approaching the rear wall 116*b* of the rear arm portion 116.

With the above-described configuration, the front upright wall 134 and the rear upright wall 136 can be linked respectively to the front wall 114*a* of the front arm portion 114 and the rear wall 116*b* of the rear arm portion 116. For this reason, stress can be efficiently distributed, and the deformation amount of the suspension frame 110 can be reduced. In addition, with this configuration, the front upright wall 134 and the rear upright wall 136 are arranged so as to cover (block) a cross-section of the center portion 112, and accordingly the effect of suppressing torsional deformation of the center portion 112 can also be obtained.

Here, as mentioned above, the suspension frame structure 100 according to the present embodiment is configured to include the right extension bracket 140*a* (extension bracket) that connects the suspension frame 110 to the vehicle structure member (not shown). As shown in FIG. 2, the right extension bracket 140*a* is smoothly attached to a rear edge of the rear arm portion 116, extending the rear arm portion 116.

As shown in FIG. 2, in the present embodiment, in a plan view, an edge line L6 of the extension bracket on the inside of the vehicle is continuous with an extension line L7 of the rear upright wall. With this configuration, the extension line L7 of the rear upright wall 136 coincides with a tangent line of the right extension bracket 140*a* at a front end of the edge line L6 on the inside of the vehicle. With this configuration, it is possible to efficiently transmit loads received by the rear upright wall 136 to the vehicle structure member via the right extension bracket 140*a*. Accordingly, it is possible to improve load distribution capability and further enhance the aforementioned deformation suppressing effect.

Furthermore, in the present embodiment, the steering gear box 150 (see FIG. 1) arranged above the suspension frame 110 is supported by the support portion 132. That is to say, the steering gear box 150 is connected to the suspension frame 110 via the support portion 132 of the reinforcement 130. Thereby, the rigidity of the suspension frame 110 can be increased by the high rigidity of the steering gear box 150.

As described above, in the present embodiment, since the front upright wall 134 and the rear upright wall 136 are joined to the support portion 132, the rigidity of the support portion 132 can be increased. It is thereby possible to increase the attaching strength of the steering gear box 150, and achieve a reduction of vibrations generated due to road noise or the like and an improvement of control stability.

Although a preferable embodiment of the present invention has been described above with reference to the attached drawings, the present invention is needless to say not limited to the above-described example. It is apparent that a person skilled in the art may conceive various variations and modifications within the scope of the appended patent claims, and those variations and modifications should be understood to be naturally encompassed in the technical scope of the present invention.

The present invention can be used in a suspension frame structure comprising a suspension frame that extends in a vehicle-width direction in a lower part of a vehicle and fixes suspension arms located on the outside in the vehicle-width direction, and a reinforcement arranged within the suspension frame.

The invention claimed is:

1. A suspension frame structure comprising:
    a suspension frame that extends in a vehicle-width direction in a lower part of a vehicle and fixes a suspension arm located on the outside in the vehicle-width direction; and
    a reinforcement arranged within the suspension frame, wherein the reinforcement includes:
        a support portion that extends in an up-down direction within the suspension frame and connects an upper wall and a lower wall of the suspension frame to each other;
        a front upright wall that extends outward in the vehicle-width direction and further to a front side of the vehicle from a side face of the support portion, the front upright wall being joined to at least one of the upper wall and the lower wall of the suspension frame; and
        a rear upright wall that extends outward in the vehicle-width direction and further to a rear side of the vehicle from the side face of the support portion, the rear upright wall being joined to at least one of the upper wall and the lower wall of the suspension frame; and
    wherein, in a plan view, the front upright wall and the rear upright wall form an L-shape that bends at the support portion.

2. The suspension frame structure according to claim 1, wherein the suspension frame includes:
    a center portion extending in the vehicle-width direction;
    a front arm portion that extends outward from a front portion of an end of the center portion and fixes the suspension arm; and
    a rear arm portion that extends outward from a rear portion of the end of the center portion and fixes the suspension arm; and
    wherein, in a plan view, the support portion is arranged inward, in the vehicle-width direction, of an intersection point of extension lines of a front wall of the center portion and a front wall of the front arm portion, or an intersection point of extension lines of a rear wall of the center portion and a rear wall of the rear arm portion; and
    wherein, in a plan view, ends of the front upright wall and the rear upright wall on the outside in the vehicle-width direction are located outward, in the vehicle-width direction, of the intersection point of extension lines of the front wall of the center portion and the front wall of the front arm portion or the intersection point of extension lines of the rear wall of the center portion and the rear wall of the rear arm portion.

3. The suspension frame structure according to claim 1, wherein, in a plan view:
    an angle of bend formed by the front upright wall and the rear upright wall is 90 degrees or greater; and
    an angle formed by a line passing through the support portion in the vehicle-width direction and the front upright wall is substantially equal to an angle formed by the line and the rear upright wall.

4. The suspension frame structure according to claim 2, wherein, in a plan view:
    an angle of bend formed by the front upright wall and the rear upright wall is 90 degrees or greater; and
    an angle formed by a line passing through the support portion in the vehicle-width direction and the front upright wall is substantially equal to an angle formed by the line and the rear upright wall.

5. The suspension frame structure according to claim 2, wherein the front upright wall extends along the front wall of the front arm portion, and the rear upright wall extends along the rear wall of the rear arm portion.

6. The suspension frame structure according to claim 2, wherein:
    the suspension frame structure further comprises an extension bracket that is smoothly attached to a rear edge of the rear arm portion so as to extend the rear arm portion, and connects the suspension frame to a vehicle structure member; and
    in a plan view, an edge line of the extension bracket on the inside of the vehicle is continuous with an extension line of the rear upright wall.

7. The suspension frame structure according to claim 4, wherein:
    the suspension frame structure further comprises an extension bracket that is smoothly attached to a rear edge of the rear arm portion so as to extend the rear arm portion, and connects the suspension frame to a vehicle structure member; and
    in a plan view, an edge line of the extension bracket on the inside of the vehicle is continuous with an extension line of the rear upright wall.

8. The suspension frame structure according to claim 5, wherein:
    the suspension frame structure further comprises an extension bracket that is smoothly attached to a rear edge of the rear arm portion so as to extend the rear arm portion, and connects the suspension frame to a vehicle structure member; and
    in a plan view, an edge line of the extension bracket on the inside of the vehicle is continuous with an extension line of the rear upright wall.

9. The suspension frame structure according to claim 1, wherein the support portion supports a steering gear box that is arranged above the suspension frame and extends in the vehicle-width direction.

10. The suspension frame structure according to claim 2, wherein the support portion supports a steering gear box that is arranged above the suspension frame and extends in the vehicle-width direction.

11. The suspension frame structure according to claim 3, wherein the support portion supports a steering gear box that is arranged above the suspension frame and extends in the vehicle-width direction.

12. The suspension frame structure according to claim 4, wherein the support portion supports a steering gear box that is arranged above the suspension frame and extends in the vehicle-width direction.

13. The suspension frame structure according to claim 5, wherein the support portion supports a steering gear box that is arranged above the suspension frame and extends in the vehicle-width direction.

14. The suspension frame structure according to claim 6, wherein the support portion supports a steering gear box that is arranged above the suspension frame and extends in the vehicle-width direction.

15. The suspension frame structure according to claim 7, wherein the support portion supports a steering gear box that is arranged above the suspension frame and extends in the vehicle-width direction.

16. The suspension frame structure according to claim 8, wherein the support portion supports a steering gear box that is arranged above the suspension frame and extends in the vehicle-width direction.

* * * * *